United States Patent [19]
DeMario et al.

[11] Patent Number: 5,303,276
[45] Date of Patent: Apr. 12, 1994

[54] FUEL ASSEMBLY INCLUDING DEFLECTOR VANES FOR DEFLECTING A COMPONENT OF A FLUID STREAM FLOWING PAST SUCH FUEL ASSEMBLY

[75] Inventors: Edmund E. DeMario; Charles N. Lawson, both of Columbia, S.C.

[73] Assignee: Westinghouse Electric Corp., Pittsburgh, Pa.

[21] Appl. No.: 968,647

[22] Filed: Oct. 29, 1992

[51] Int. Cl.[5] .............................................. G21C 3/34
[52] U.S. Cl. ..................................... 376/442; 376/438; 376/439
[58] Field of Search ............... 376/442, 438, 439, 434, 376/448, 444; 976/DIG. 71, DIG. 81, DIG. 75, DIG. 76

[56] References Cited

U.S. PATENT DOCUMENTS

| | | | |
|---|---|---|---|
| 3,764,470 | 10/1973 | Calvin | 376/442 |
| 3,764,471 | 10/1973 | Ripley | 376/442 |
| 4,312,706 | 1/1982 | Snyder, Jr. et al. | 376/444 |
| 4,692,302 | 8/1987 | DeMario et al. | 376/439 |
| 4,827,063 | 5/1989 | Bokers et al. | 376/439 |
| 5,186,891 | 2/1993 | Johansson et al. | 376/438 |

*Primary Examiner*—Donald P. Walsh
*Assistant Examiner*—Meena Chelliah

[57] ABSTRACT

Fuel assembly including deflector vanes for deflecting a component of a fluid stream flowing past such fuel assembly. The fuel assembly comprises a lattice member having rhombic-shaped rod cells and generally rhombic-shaped thimble cells therethrough. A plurality of parallel fuel rods extend through respective ones of the rod cells and a plurality of parallel control rod guide thimble tubes extend through respective ones of the thimble cells. A plurality of deflector vanes are associated with each rod cell and are integrally attached thereto on the upstream edge of each rod cell. Each deflector vane extends above its associated rod cell and curvilinearly protrudes partially over the rod cell for deflecting a component of the fluid stream onto the exterior surface of the fuel rod that extends through the rod cell. The deflector vane and the rhombic shape of each rod cell coact to create a vortex centered about the longitudinal axis of the fuel rod for maintaining liquid substantially single-phase fluid flow along the exterior surface of the fuel rod, such that DNB is avoided even in the presence of high heat fluxes across the exterior surface of the fuel rod.

11 Claims, 8 Drawing Sheets

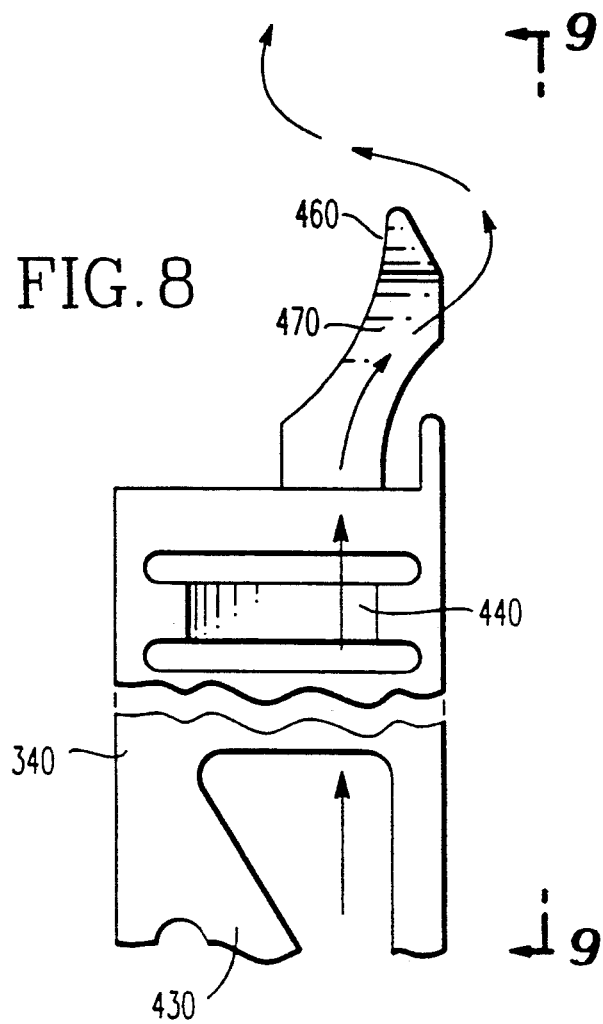
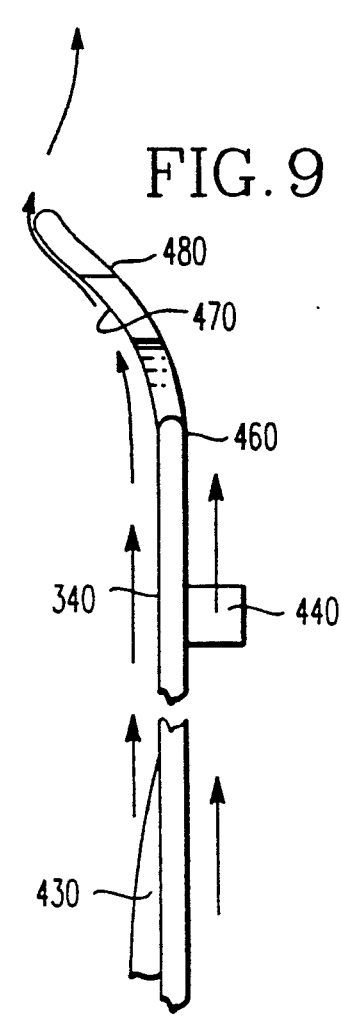
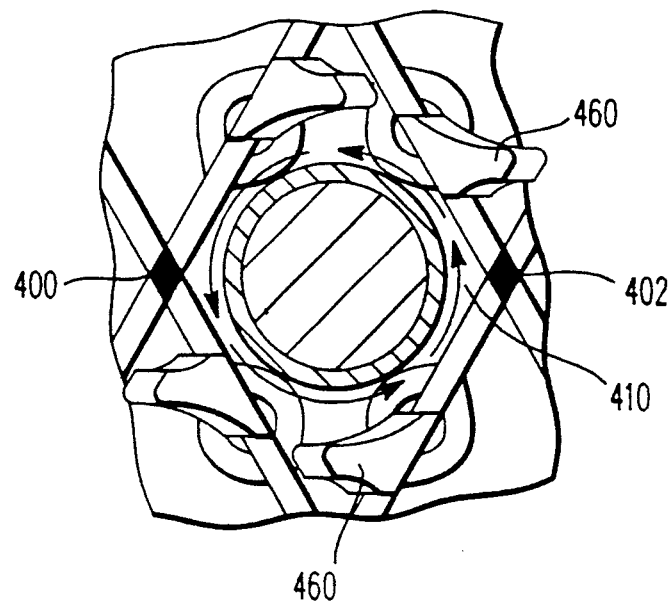

FUEL ASSEMBLY INCLUDING DEFLECTOR VANES FOR DEFLECTING A COMPONENT OF A FLUID STREAM FLOWING PAST SUCH FUEL ASSEMBLY

CROSS REFERENCE TO RELATED APPLICATIONS

This patent application is related to copending U.S. patent application Ser. No. 07/884,972 titled "A Nuclear Fuel Assembly For Increasing Utilization Of Nuclear Fuel Contained Therein" filed May 15, 1992 in the name of David R. Stucker and copending U.S. patent application Ser. No. 07/968,011 titled "Method of Making A Fuel Assembly Lattice Member And The Lattice Member Made By Such Method" filed Oct. 29, 1992 in the name of Edmund E. DeMario et al.

BACKGROUND

This invention generally relates to fuel assemblies and more particularly relates to a fuel assembly including deflector vanes for deflecting a component of a fluid stream flowing past such fuel assembly, which fuel assembly may be of the kind typically found in nuclear power reactor cores.

Before discussing the state of the art, it is instructive first to briefly describe the structure and operation of a typical nuclear power reactor, which contains a plurality of nuclear fuel assemblies. In this regard, a nuclear power reactor is a device for producing heat by the controlled fission of nuclear fuel material contained in a plurality of adjacent fuel rods. The fuel rods are bundled together by a plurality of spaced-apart grids, each grid having open cells for receiving each fuel rod therethrough and for obtaining a predetermined distance (i.e., pitch) between the adjacent fuel rods. Moreover, hollow control rod guide thimble tubes are also received through other open cells of each grid. The thimble tubes slidably accept movable absorber or control rods capable of controlling the fission process. A first end portion and a second end portion of each thimble tube are attached to a top nozzle and a bottom nozzle, respectively, for providing rigid structural support to the fuel assembly. The combination of the fuel rods, guide thimble tubes, grids, top nozzle and bottom nozzle is typically referred to in the art as a fuel assembly. A plurality of these fuel assemblies are grouped to define a nuclear reactor pressure vessel.

During operation of the nuclear reactor, a flow stream of liquid moderator coolant (e.g., demineralized water) is caused to flow through the pressure vessel and over the fuel rods for assisting the fission process and for removing the heat produced by fission of the nuclear fuel material contained in each fuel rod. The flow velocity of the coolant, which is pumped over the fuel rods by reactor coolant pumps, may be approximately 18 feet per second, in the case of the typical pressurized water nuclear power reactor, for efficiently removing the heat produced by the fission process. That is, heat due to fission of the nuclear material is transferred from each of the fuel rods, and hence from each fuel assembly, to the liquid moderator coolant flowing past the fuel rods. The heat transferred to the liquid moderator coolant is ultimately carried by the coolant from the pressure vessel to a turbine-generator for generating electricity in a manner well known in the art of electrical power generation. As discussed hereinbelow, it is important for safety reasons that the coolant efficiently removes the heat produced by each fuel rod. For this purpose, the heated surface of each fuel rod should be in contact with the coolant which has a predetermined average bulk coolant temperature.

It is known that the heat flux (i.e., rate of heat transfer per unit area) transversely across the heated surface of the fuel rod will vary as a function of the temperature difference between the heated surface of the fuel rod and the bulk coolant. In order to appreciate the importance of this relationship between heat flux and temperature difference, the discussion immediately hereinbelow provides a description of the manner in which the heat flux varies as a function of the temperature difference between the heated surface of the fuel rod and the bulk coolant. That is, as the difference between the surface temperature of the fuel rod and the bulk coolant is allowed to increase during start-up of the reactor, heat will be transferred from the heated surface to the coolant by single-phase convection, thereby increasing the heat flux. As the difference between the fuel rod surface temperature and the average bulk coolant temperature further increases, the temperature of the heated surface will eventually exceed the saturation temperature (i.e., temperature of saturated steam at the existing pressure in the reactor core) and vapor bubbles will form on the heated surface to produce nucleate boiling on the heated surface in a manner that rapidly increases the heat flux. A maximum heat flux will then occur when the bubbles become dense enough that they coalesce and form a vapor film on the heated surface. However, the vapor film will act as a heat insulator because vapor inhibits heat transfer. This point of maximum heat flux where the vapor film forms on the heated surface is commonly referred to in the art as Departure from Nucleate Boiling (DNB) and is to be avoided for safety reasons. Thus, if the difference between the surface temperature and the bulk temperature is allowed to further increase by even a small amount beyond the maximum heat flux (DNB), the heat flux will rapidly substantially decrease even though the temperature of the heated surface increases. The vapor film on the fuel rod at this point becomes unstable in the sense that the vapor film alternately breaks-down and then reforms so as to produce partial film boiling. If the difference between the surface temperature and the bulk coolant temperature is allowed to increase still further, the heat flux will again increase and stable vapor film boiling will occur. However, if large heat fluxes occur simultaneously with film boiling (i.e., either partial or stable film boiling), the temperature of the heated surface of the fuel rod may become high enough to damage the fuel rod (referred to in the are as "burnout") and is to be avoided for safety reasons. Thus, it is well understood by persons having ordinary skill in the art that if the reactor is operated such that nucleate boiling occurs near DNB, a relatively small increase in the heat flux will cause a relatively rapid change to film boiling that may result in "burnout". Therefore, it is prudent to operate the nuclear reactor such that the highest heat flux is less than the maximum heat flux associated with DNB in order to obtain the highest allowable heat generation without risking damage to the fuel rod.

As discussed hereinabove, a vapor bubble film may form on the heated surface of the fuel rod to produce boiling thereon; however, the vapor film will act as a heat insulator because vapor inhibits heat transfer and may lead to DNB that may in turn lead to fuel rod damage. Hence, it is desirable to maintain a film of liquid substantially single-phase coolant on the surface of the fuel rod to enhance heat transfer from the fuel rod to the coolant while avoiding DNB. Therefore, a problem in the art is to maintain a film of liquid substantially single-phase coolant on the surface of the fuel rod to enhance heat transfer from the fuel rod to the coolant while avoiding DNB.

Enhancing heat transfer from the fuel rod to the coolant while avoiding DNB increases the maximum allowable heat flux obtainable from a given reactor core size. This is desirable because increasing the maximum allowable heat flux obtainable from a given reactor core size increases the maximum allowable power obtainable from the reactor core. In this regard, heat transfer from the fuel rod to the coolant may be enhanced by increasing the bulk coolant flow velocity over the fuel rods. However, increasing the flow velocity of the coolant may require larger and more costly reactor coolant pumps. Therefore, another problem in the art is to more efficiently enhance heat transfer from the fuel rod to the coolant without requiring larger and more costly reactor coolant pumps.

Maintaining a film of liquid substantially single-phase coolant on the surface of the fuel rod to enhance heat transfer from the fuel rod to the coolant while avoiding DNB in a manner not requiring larger coolant pumps has assumed added importance in recent years because some current reactor core designs require the previously mentioned fuel rods to be arranged in a denser triangular pitch array rather than in the more traditional and less dense square pitch array. Thus, in some reactor core designs, the fuel assemblies containing the fuel rods may have a hexagonal transverse cross-section for suitably achieving the "dense-pack" triangular pitch array. Fuel rods arranged in a triangular pitch array obtain a higher average heat flux density from a reactor core of given size compared to fuel rods arranged in the more traditional square pitch array. Obtaining a higher average heat flux density using densely packed fuel assemblies is desirable for economic reasons because such densely packed fuel assemblies achieve more revenue-producing power per unit volume of the reactor core which in turn increases return on plant investment. However, higher heat flux tends to increase the risk of DNB and is therefore undesirable for safety reasons, as discussed hereinabove. Thus, it has become very important to adequately cool such fuel assemblies and the densely packed fuel rods contained therein such that DNB is avoided while simultaneously obtaining a higher heat flux per unit volume of the reactor core.

Fuel assemblies suitable for use in nuclear reactor cores are known. One such fuel assembly is disclosed in U.S. Pat. No. 3,787,285 titled "Fuel Assembly For A Nuclear Reactor And A Nuclear Reactor Core Comprising Such Fuel Assemblies" issued Jan. 22, 1974 in the name of Jorgen Marstrand. This patent discloses a fuel assembly having guide vanes, the axes of which are parallel to the fuel rods and impart a vortical motion to the coolant flowing along the vanes to permit higher energy flux density. The fuel rods are arranged in a hexagonal pattern such that the outer contour of the fuel assembly is hexagonal. A plurality of vanes are disposed about, and tilted with respect to, a central axis to cause the fluid flow over the fuel elements to follow a generally helical path about the central axis. Although the Marstrand patent discloses a fuel assembly having an outer hexagonal contour and a plurality of guide vanes, the Marstrand patent does not appear to disclose a fuel assembly including deflector vanes for deflecting a component of a fluid stream flowing past such fuel assembly, as described and claimed hereinbelow.

Another fuel assembly is disclosed in U.S. Pat. No. 3,281,327 titled "Nuclear Fuel Assemblies" issued Oct. 25, 1966 in the name of John Webb, et al. This patent discloses a spacer grid comprising a support member in the form of an outer metal sleeve of regular hexagonal cross-section. This patent also discloses that the grid has a parallel array of spacer diaphragms adapted to be penetrated by fuel elements and titled with respect to the longitudinal axis of the fuel element. According to this patent, the spacer diaphragms act as deflector vanes imparting to the main flowstream a component of flow transversely of the fuel elements. According to the Webb, et al. patent the diaphragms are advantageous from a heat transfer standpoint because they promote swirling of the coolant to reduce so-called "hot channel factors". Although the Webb, et al. patent discloses a fuel assembly having a parallel array of spacer diaphragms that promote swirling of the coolant to improve heat transfer, the Webb et al. patent does not appear to disclose a fuel assembly including deflector vanes for deflecting a component of a fluid stream flowing past such fuel assembly, as described and claimed hereinbelow.

Although the above recited patents disclose fuel assemblies suitable for use in nuclear reactor cores, these patents do not appear to disclose a fuel assembly including deflector vanes for deflecting a component of a fluid stream flowing past such fuel assembly, as described and claimed hereinbelow.

Therefore, what is needed is a fuel assembly including deflector vanes for suitably deflecting a component of a fluid stream flowing past such fuel assembly.

SUMMARY

Disclosed herein is a fuel assembly including deflector vanes for deflecting a component of a fluid stream flowing past such fuel assembly. The fuel assembly comprises a lattice member having rhombic-shaped rod cells and generally rhombic-shaped thimble cells therethrough. A plurality of parallel fuel rods extend through respective ones of the rod cells and a plurality of parallel control rod guide thimble tubes extend through respective ones of the thimble cells. A plurality of deflector vanes are associated with each rod cell and are integrally attached thereto on the upstream edge of each rod cell. Each deflector vane extends above its associated rod cell and curvilinearly protrudes partially over the rod cell for deflecting a component of the fluid stream onto the exterior surface of the fuel rod that extends through the rod cell. The deflector vane and the rhombic shape of each rod cell coact to create a vortex centered about the longitudinal axis of the fuel rod for maintaining liquid substantially single-phase fluid flow along the exterior surface of the fuel rod, such that DNB is avoided even in the presence of high heat fluxes across the exterior surface of the fuel rod.

An object of the present invention is to provide a fuel assembly including deflector vanes for deflecting a component of a fluid stream flowing past such fuel assembly.

Another object of the present invention is to provide a fuel assembly containing fuel rods, on the outside surface of which is maintained a film of liquid substantially single-phase coolant to enhance heat transfer from the fuel rod to the coolant to avoid DNB.

Yet another object of the present invention is to provide a fuel assembly that efficiently enhances heat transfer from the fuel rod to the coolant without requiring larger and more costly reactor coolant pumps to increase fluid flow velocity.

A feature of the present invention is the provision of a lattice member defining a plurality of rhombic-shaped rod cells for receiving fuel rods therethrough and deflector vanes protruding above and partially over each rod cell, the rhombic-shape of the rod cells coacting with the deflector vanes to swirl the coolant about the longitudinal axis of each fuel rod.

An advantage of the present invention is that it obtains a reactor core that produces more revenue-producing power while simultaneously avoiding damage to the fuel rods therein.

Another advantage of the present invention is that it obtains liquid substantially single-phase coolant flow over the surface of each fuel rod even in the presence of high heat fluxes so that the fuel rods are not damaged during normal reactor operation.

These and other objects, features, and advantages of the present invention will become apparent to those skilled in the art upon a reading of the following detailed description when taken in conjunction with the drawings wherein there is shown and described illustrative embodiments of the invention.

BRIEF DESCRIPTION OF THE DRAWINGS

While the specification concludes with claims particularly pointing out and distinctly claiming the subject matter of the invention, it is believed the invention will be better understood from the following description, taken in conjunction with the accompanying drawings wherein:

FIG. 8 is a view in elevation of one of the deflector vanes showing the direction of the fluid stream as it is deflected by the deflector vane;

FIG. 9 is a lateral view in elevation of the deflector vane taken along section line 9—9 of FIG. 8; and FIG. 10 is a plan view of one of the rod cells showing the direction of vortical fluid flow around the fuel rod that extends through the rod cell.

DESCRIPTION OF THE PREFERRED EMBODIMENT(S)

In the typical nuclear reactor, heat due to fission of nuclear material contained in fuel rods is transferred from the fuel rods to liquid moderator coolant flowing past the fuel rods. It is important for safety reasons that the coolant efficiently removes the heat produced by each fuel rod such that DNB is avoided. According to the invention, such efficient removal of heat from the surface of the fuel rod is obtained by curved deflector vanes belonging to a fuel assembly, which contains the fuel rods.

However, before describing the subject matter of the present invention, it is instructive first to briefly describe the structure and operation of a typical nuclear power reactor.

Figure 1:
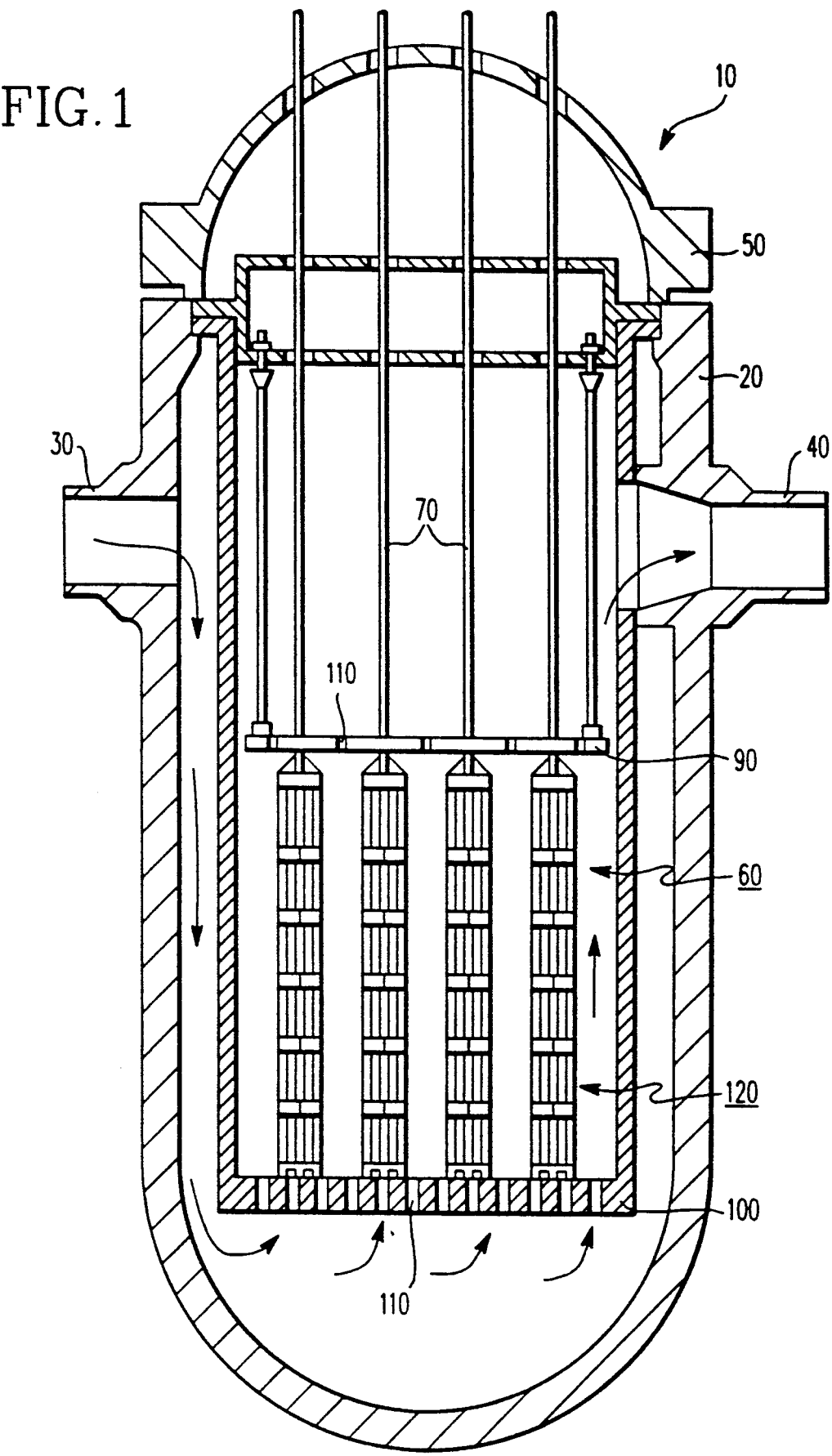
FIG. 1 shows in partial vertical section, a typical nuclear power reactor pressure vessel with parts removed for clarity, the reactor pressure vessel having fuel assemblies of the invention disposed therein, each of the fuel assemblies including a plurality of fuel rods and control rod guide thimble tubes.
Figure 2:
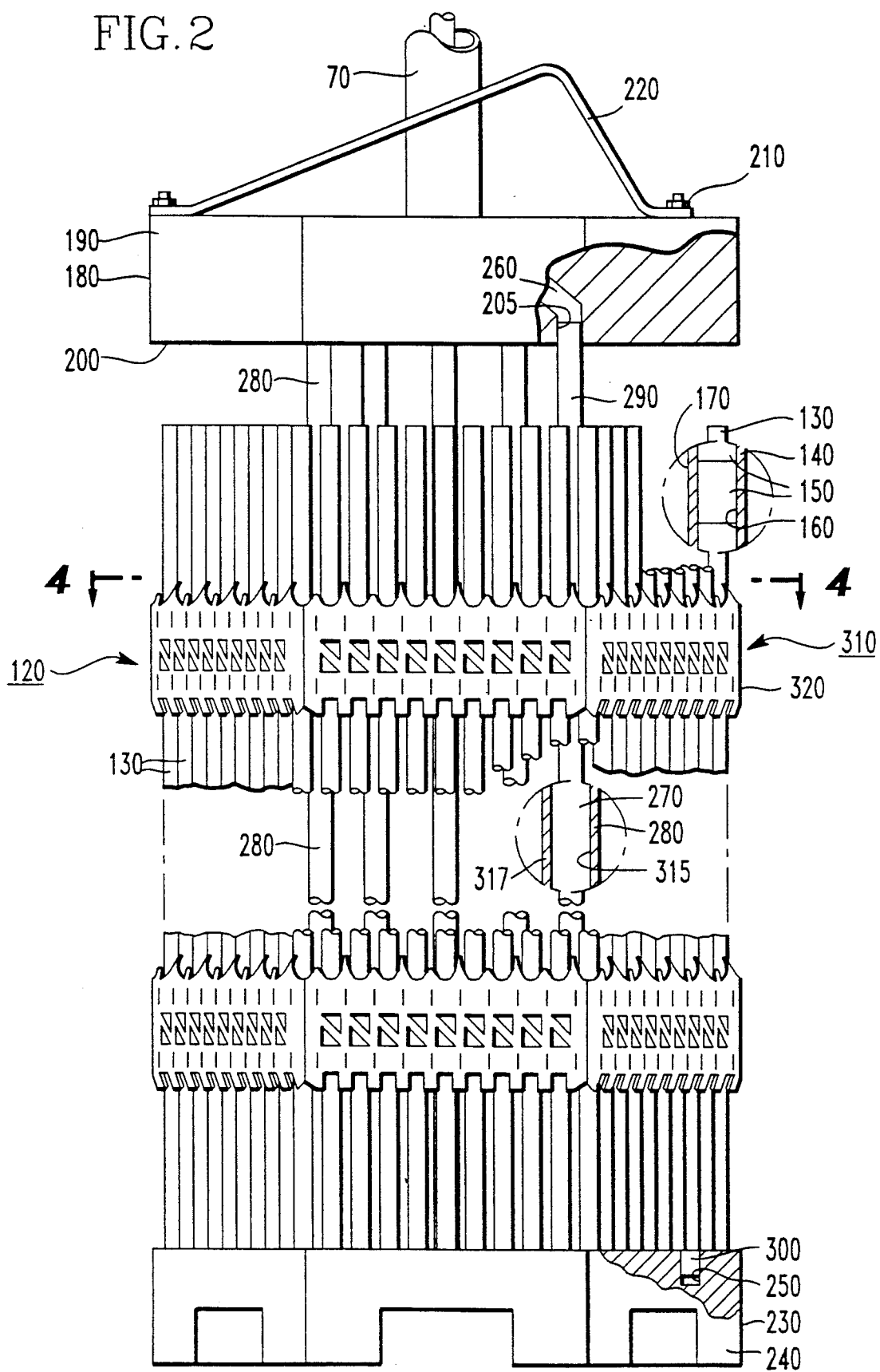
FIG. 2 shows in partial vertical elevation, one of the fuel assemblies.
Figure 3:
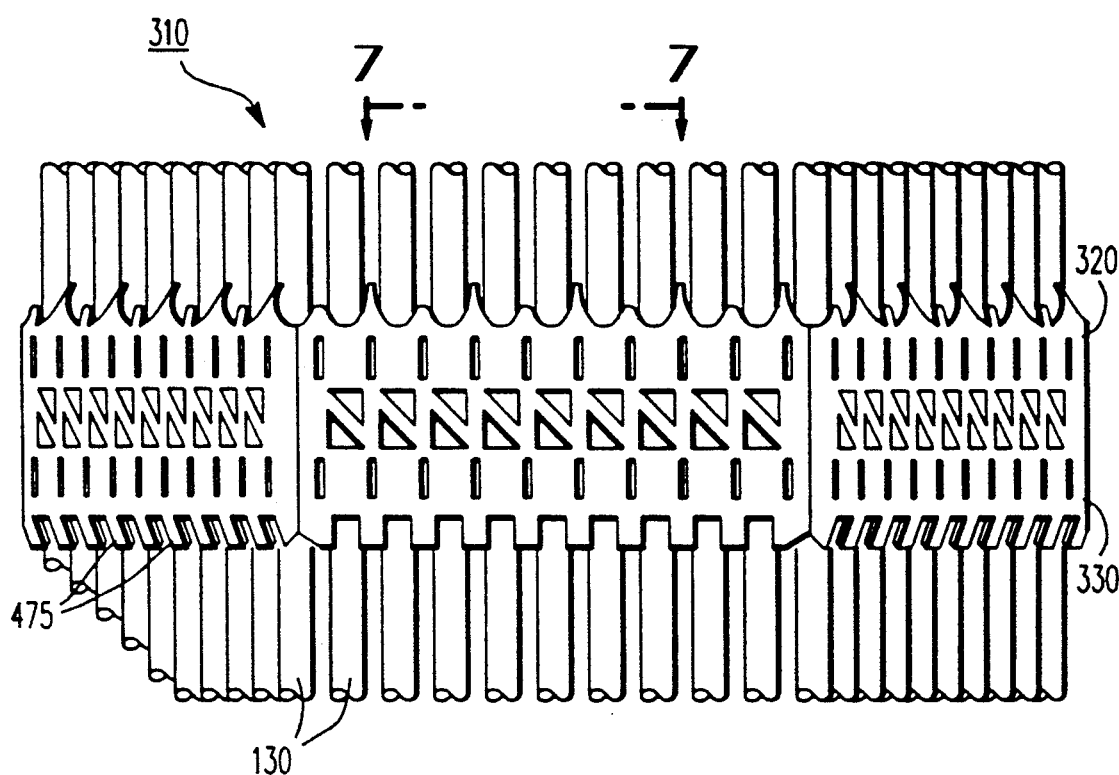
FIG. 3 is a fragmentation view in elevation showing a lattice member for supporting the fuel rods and thimble tubes.

Therefore, referring to FIG. 1, there is shown a typical nuclear power reactor, generally referred to as 10, for producing heat by the controlled fission of nuclear fuel material 150 (see FIG. 2). As shown in FIG. 1, reactor 10 includes pressure vessel shell 20 having an open top end and a plurality of inlet nozzles 30 and outlet nozzles 40 attached thereto (only one of each nozzle is shown). A closure head 50 is sealingly mounted atop vessel shell 20 so that closure head 50 sealingly mounted atop vessel shell 20 so that closure head 50 sealingly caps or closes open vessel shell 20. Capping vessel shell 20 in this manner allows for suitable pressurization of the coolant within vessel shell 20 as reactor 10 operates.

Still referring to FIG. 1, disposed in vessel shell 20 is a nuclear reactor core, generally referred to as 60, containing nuclear fuel 150. Disposed through the top of closure head 50 are a plurality of control rod drive shafts 70. Each drive shaft 70 is connected to a plurality of control rods 270 (see FIG. 2) for controlling the fission process in reactor core 60 in a manner well known in the art of nuclear power production. As shown in FIG. 1, disposed inwardly of reactor vessel shell 20 are a horizontal upper core plate 90 and a horizontal lower core plate 100 spaced-apart from upper core plate 90. Lower core plate 100 and upper core plate 90 each has a multiplicity of coolant flow orifices 110 transversely therethrough for flow of the coolant that removes the heat produced by fission of nuclear fuel 150.

During operation of reactor core 10, control rods 80 are at least partially withdrawn from reactor core 60 by operation of drive shaft 70 to sustain the fission chain reaction. As heat is produced by reactor core 60, a fluid flow stream of liquid moderator coolant (e.g., demineralized water) is caused to enter inlet nozzle 30 and circulate generally upwardly through reactor core 60 in the direction illustrated by the vertical arrows in FIG. 1. The liquid moderator coolant assists the fission process by "moderating" neutrons in reactor core 60 and also carries away the heat produced by the fission process. The liquid moderator coolant exits nuclear reactor 10 through outlet nozzle 40, whereupon it is piped to a heat exchange device (not shown) for generating steam. The steam is then piped from the heat exchange device to a turbine-generator (not shown) for producing electricity in a manner well known in the art of electrical power production.

Referring to FIG. 2, there is more clearly shown the subject matter of the present invention, which is a fuel assembly including deflector vanes for deflecting a component of a fluid stream flowing past such fuel assembly, as more particularly described and claimed hereinbelow. The fuel assembly, generally referred to as 120, comprises a plurality of elongate generally cylindrical fuel rods 130 vertically arranged in spaced parallel array. Each fuel rod 130 in turn comprises an elongate, hollow and generally cylindrical metal casing or cladding 140 for sealingly enclosing a plurality of generally cylindrical fuel pellets 150 capable of generating heat by nuclear fission. Cladding 140 has an inside diameter 160 and an outside diameter 170 and may be any suitable metal having a relatively small microscopic cross section for neutrons, such as "ZIRCALOY-4". In this regard, "ZIRCALOY-4" is by weight composed of approximately 1.5% tin, 0.12% iron, 0.09% chromium, 0.05% nickel, and 98.24% zirconium. Each fuel pellet 150 is formed from a nuclear fuel material comprising fissile nuclei, such as U-235 (i.e., uranium-235) uniformly dispersed in a matrix of fertile nuclei, such as U-238 (i.e., uranium-238), for generating heat by the process of nuclear fission. Fuel assembly 120 further comprises a first nozzle or first tie plate 180 having a top portion 190 and a bottom portion 200, which first tie plate 180 may have a regular hexagonal transverse cross section. First tie plate 180 has a plurality of transverse bores 205 therein (only one of which is shown) for reasons described hereinbelow. Connected to top portion 190 of first tie plate 180, such as by hold-down fasteners or screws 210, is a flexible hold-down spring 220. Hold-down spring 220 outwardly projects from top portion 190 of first tie plate 180 for abutting upper core plate 90, such that first tie plate 180 and thus fuel assembly 120 are downwardly biased onto lower core plate 100 as fuel assembly 120 is vertically interposed between upper core plate 90 and bottom core plate 100. Downwardly biasing fuel assembly 120 prevents lift-off of fuel assembly 120 from lower core plate 100, which lift-off may otherwise occur due to the upward hydraulic force exerted by the coolant fluid stream as the fluid stream flows through reactor core 60 generally upwardly along a unidirectional flow axis. Coaxially aligned with and spaced-apart from first tie plate 180 is a second nozzle or second tie plate 230, which may have a regular hexagonal transverse cross section. Second tie plate 230 includes a plurality of outwardly projecting feet 240 integrally formed therewith for resting fuel assembly 120 in a predetermined location on bottom core plate 100. Second tie plate 230 has a plurality of bores 250 (only one of which is shown) therein for reasons described hereinbelow.

Referring again to FIG. 2, connected to top portion 190 of first tie plate 180 is drive shaft 70 having radially outwardly extending arms 260 for reasons described presently. Attached to each arm 260 and slidably extending through bore 205 is an elongate neutron absorber rod or control rod 270 for controlling the fission process in fuel assembly 120. The plurality of control rods 270, which extend outwardly through bottom portion 200 of first tie plate 180, are arranged in spaced parallel array. Each control rod 270 is made from a suitable material, such as $B_4C$ (i.e., boron carbide), having a relatively large microscopic absorption cross section for neutrons. Moreover, each control rod 270 is sized to be slidably received in an elongate, generally cylindrical and hollow control rod guide thimble tube 280 that outwardly extends from bottom portion 200 of first tie plate 180, each thimble tube 280 having a first end portion 290 and a second end portion 300. Each thimble tube 280 also has an inside diameter 315 and an outside diameter 317. First end portion 290 of each thimble tube 280 is received in its respective bore 205 belonging to first tie plate 180 and secured thereat, such as by bulging or welding. Moreover, second end portion 300 of each thimble tube 280 is received in its respective bore 250 belonging to second tie plate 230 and secured thereat, such as by a screw (not shown) or by weldments. In this manner, first tie plate 180 and second tie plate 230 are interconnected by thimble tubes 280 for providing rigidity and structural integrity to fuel assembly 120.

Figure 4:
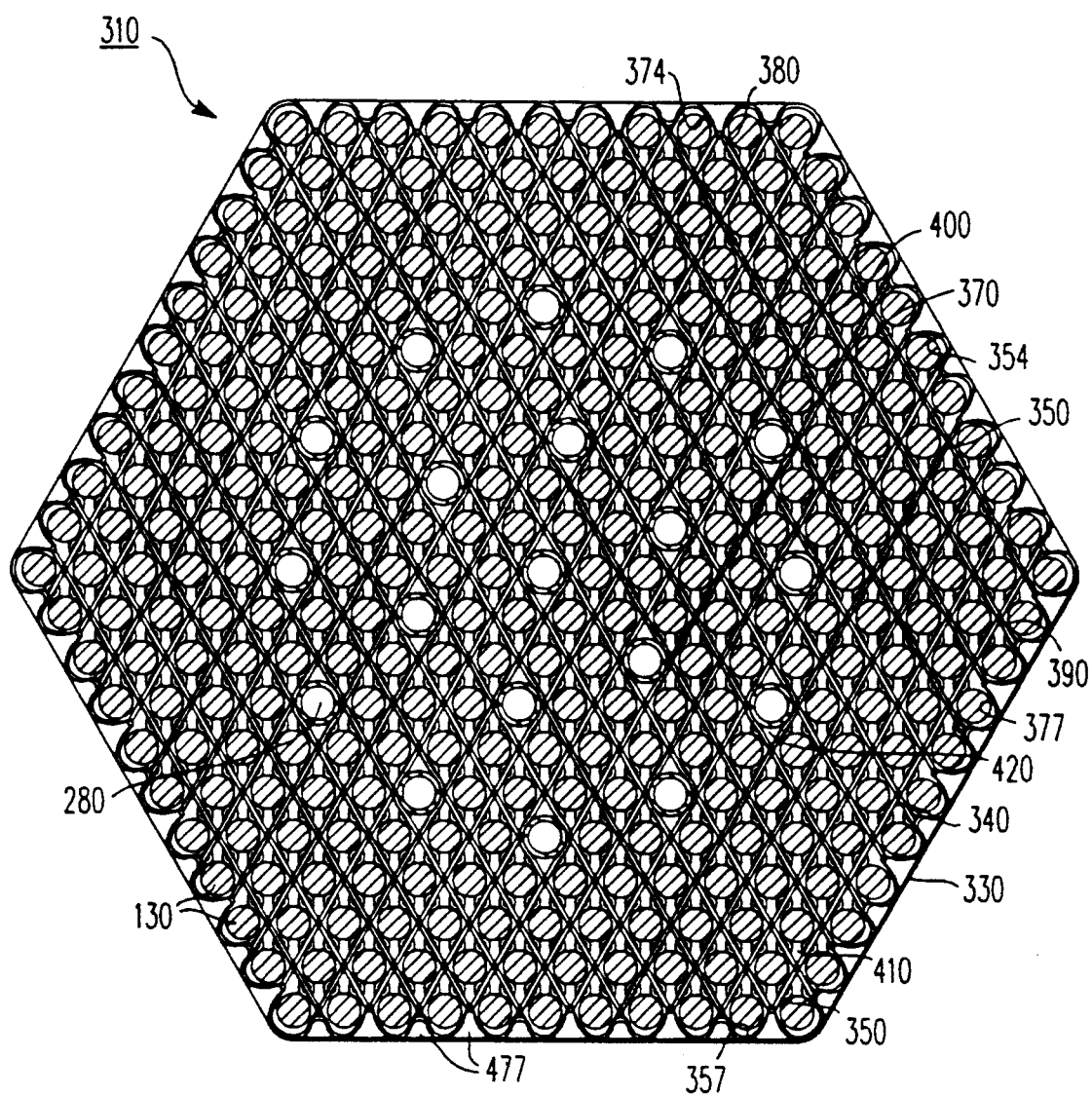
FIG. 4 is a plan view of the lattice member taken along section line 4—4 of FIG. 2.
Figure 5:
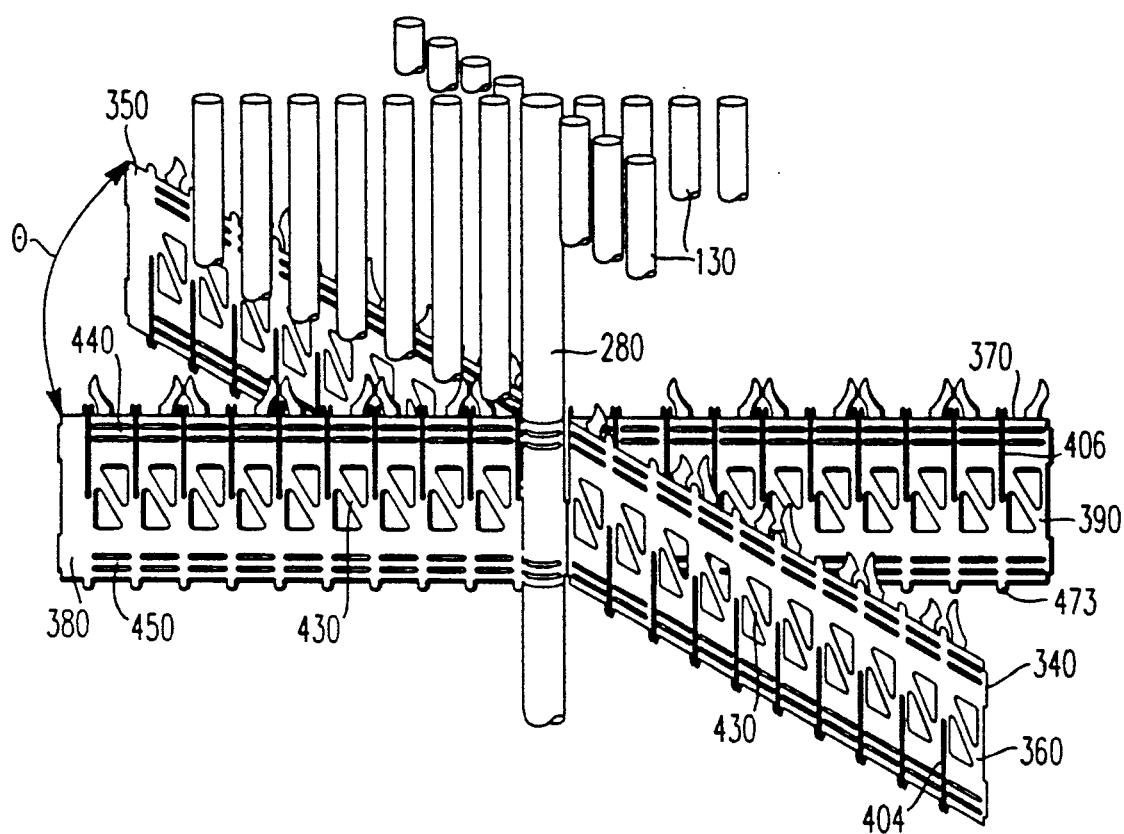
FIG. 5 is a view in perspective of a first inner strap and a second inner strap belonging to the lattice member, the first and second inner straps being configured to be interlockable and having deflector vanes integrally attached thereto.

Referring now to FIGS. 2, 3, 4, 5 and 6, spaced along the axial length of thimble tubes 280 and fuel rods 130 and coaxially interposed between first tie plate 180 and second tie plate 230 are a plurality of coaxially aligned lattice members, generally referred to as 310, for maintaining thimble tubes 280 and fuel rods 130 in their predetermined spaced parallel array configuration. Each lattice member 310 may be made from "ZIRCALOY-4", or the like, for the previously described reasons of neutron economy. Each lattice member 310 includes an outer strap 320 having a regular hexagonal transverse contour disposed edgewise in the fluid stream. That is, outer strap 320 has six integrally attached elongated side panels 330, each side panel 330 being disposed at a predetermined obtuse angle with respect to its adjacent side panel 330 for defining the regular hexagonally-shaped transverse contour of outer strap 330. Disposed edgewise to the fluid stream and transversely interiorly of outer strap 320 are a plurality of elongate parallel first inner straps 340, each first inner strap 340 having a predetermined length. Each first inner strap 340 has a first end portion 350 integrally attached to an interior wall, such as interior wall 374, of outer strap 320 and a second end portion 360 integrally attached to another interior wall, such as interior wall 377, of outer strap 320 such that each first inner strap 340 is parallel to a preselected one of the side panels 330, for reasons disclosed hereinbelow. Moreover, disposed edgewise to the fluid stream and transversely interiorly of outer strap 320 are a plurality of elongate parallel second inner straps 370, each second inner strap 370 having a predetermined length. Each second inner strap 370 similarly has a first end portion 380 integrally attached to an interior wall of outer strap 320 and a second end portion 390 integrally attached to another interior wall of outer strap 320, for reasons disclosed hereinbelow. As described in more detail hereinbelow, each second inner strap 370 intersects and interlocks with each first inner strap 340 at an intersection plane 400 to provide lattice member 310 with an egg crate-like construction. First inner strap 340 and second inner strap 370 are thusly joined at intersection plane 400 and may be secured thereat such as by weldments 402. In the preferred embodiment of the invention, each second inner strap 370 intersects each first inner strap 340 at an angle "$\phi$" of approximately 29 degrees with respect to first inner strap 340 for defining a plurality of rhombic-shaped rod cells 410 and a plurality of generally rhombic-shaped thimble cells 420 through lattice member 310. First inner strap 340 has a plurality of throughway slots 404 perpendicular to and extending from the downstream edge of first inner strap 340 to approximately the longitudinal axis (i.e., the mid-portion) of first inner strap 340 for reasons described presently. Moreover, second inner strap 370 has a plurality of throughway slots 406 perpendicular to and extending rom the upstream edge of second inner strap 370 to approximately the longitudinal axis (i.e., the mid-portion) of second inner strap 340 for reasons described presently. The purpose of slots 404/406 is to provide means for interlocking or interconnecting first inner straps 340 and second inner straps 370. That is, each slot 404 extending from the downstream edge of each first inner strap 340 is positioned so as to be mated with its respective slot 406 formed in the upstream edge of second inner strap 370. Similarly, each slot 406 extending from the upstream edge of each second inner strap 370 is positioned so as to be mated with its respective slot 404 formed in the downstream edge of first inner strap 340. In this manner, each first inner strap 340 is interlocked or interconnected with each second inner strap 370 to define the egg crate-like construction of lattice member 310. The egg crate-like construction of lattice member 310 provide maximum structural integrity to lattice member 310 while minimizing the weight of lattice member 310. It is to be appreciated that the terminology "downstream edge" is defined herein to mean that edge which is downstream of fluid flow in reactor core 60 and the terminology "upstream edge" is defined herein to mean that edge which is upstream of fluid flow. Thus, first inner strap 340 and second inner strap 370 are interlocked when the upstream edge of each second inner strap 370 is matingly seated in slots 404 of each first inner straps 370 and when the downstream edge of each first inner strap 340 is matingly seated in slots 406 of each second inner strap 370. When first inner straps 340 and second inner straps 370 are interlocked in this manner, each first inner strap 340 will intersect each second inner strap 370 at intersection plane 400 and at the predetermined angle "φ", which may be approximately 29 degrees, as best seen in FIG. 5, for defining rhombic-shaped rod cells 410 and generally rhombic-shaped thimble cells 420. This is important because, when fuel rods 130 are extended through their respective rod cells 410, they will obtain a triangular pitch for providing "dense-pack" fuel assembly 120.

As best seen in FIG. 4, each fuel rod 130 extends through respective ones of the rod cells 410 and has a longitudinal center axis generally parallel to the flow axis of the fluid stream. In addition, each thimble tube 280 extends through respective ones of the thimble cells 420 and has a longitudinal axis generally parallel to the flow axis of the fluid stream. Thus, it will be appreciated by reference to FIG. 4 that each control rod 270 is surrounded by its associated fuel rods 130 for suitably controlling the fission process in fuel rods 130.

Figure 6:
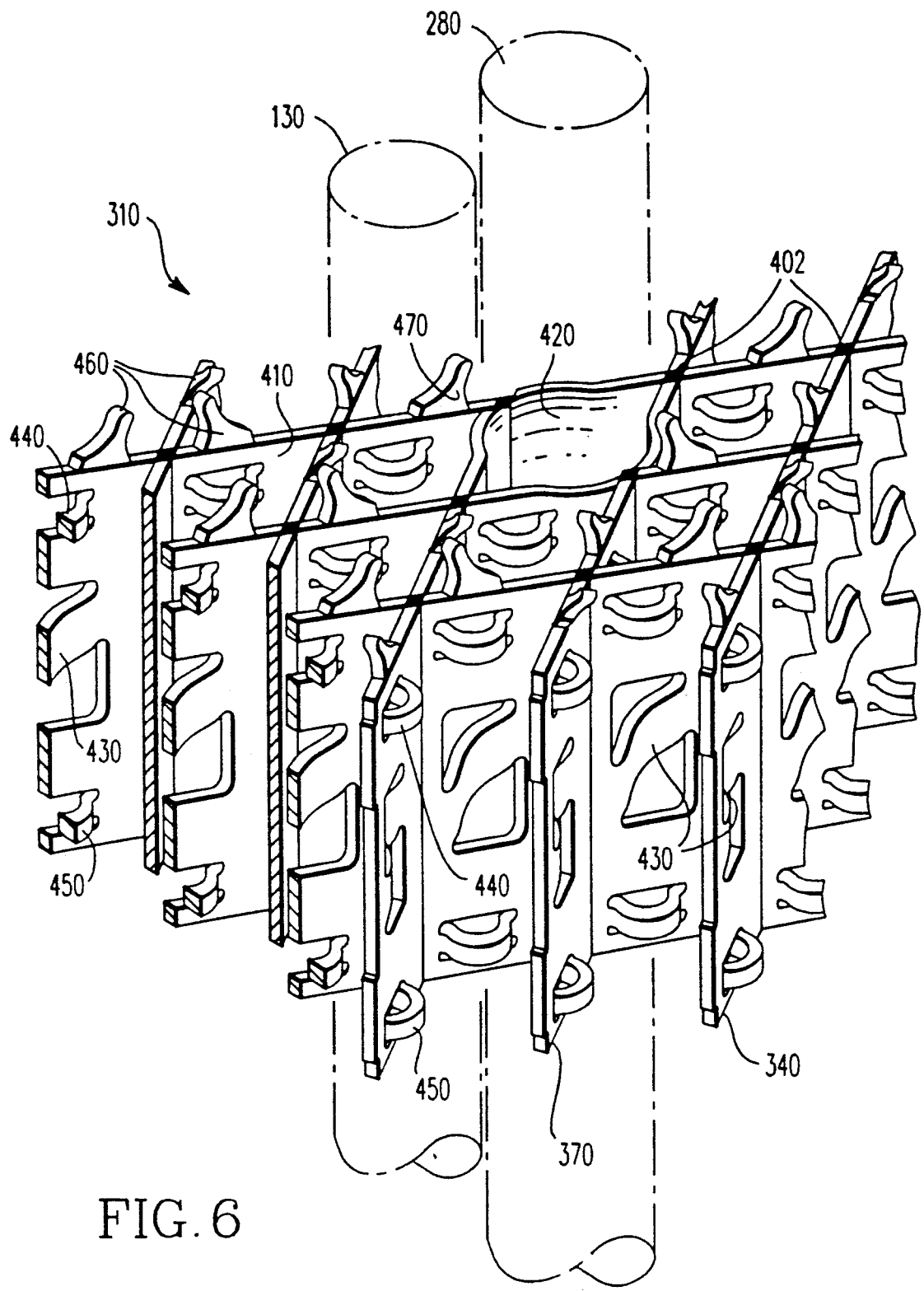
FIG. 6 is a fragmentation view in perspective of the lattice member with one thimble tube and one fuel rod extending therethrough, the thimble tube and fuel rod being shown in phantom.
Figure 7:
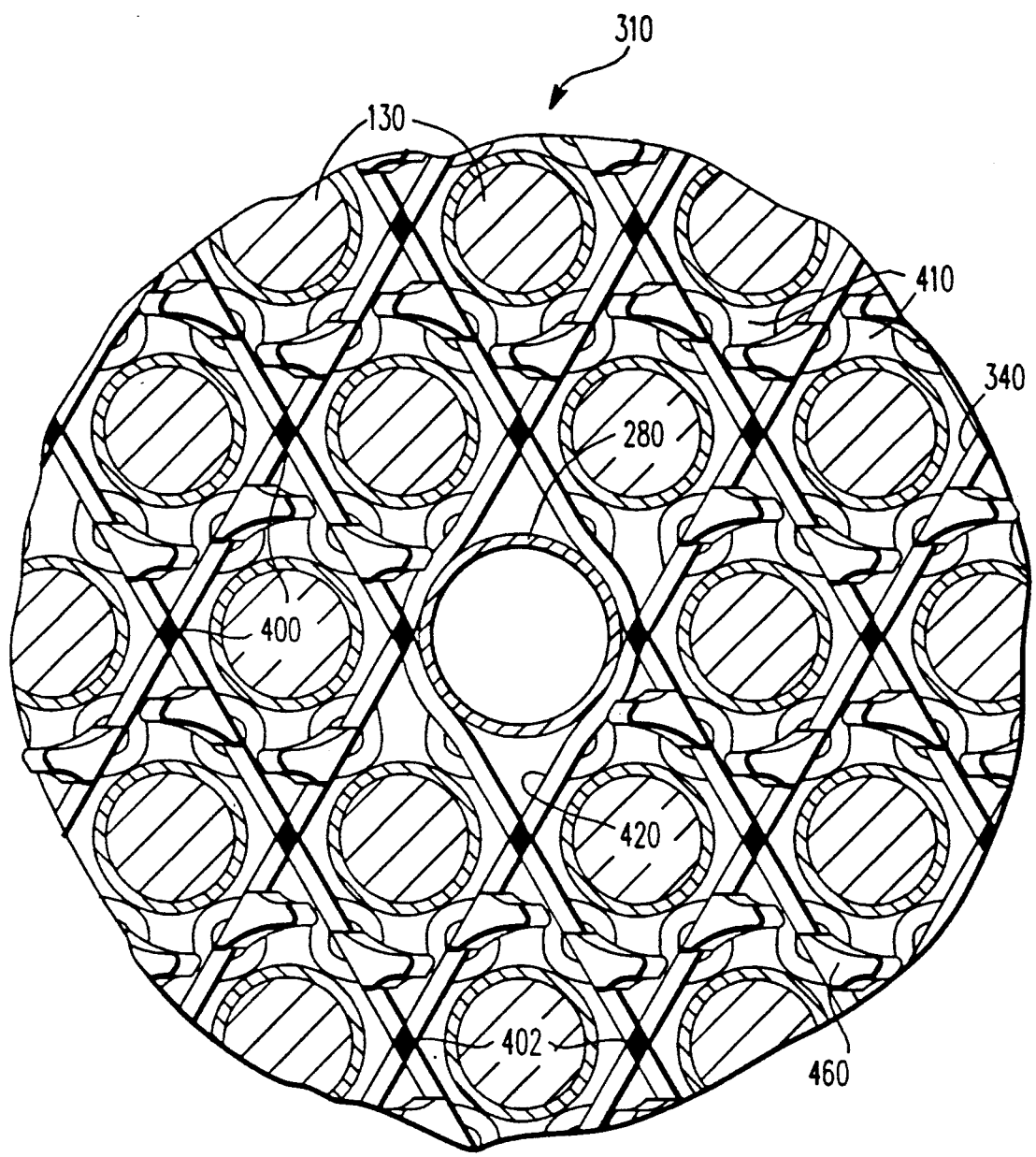
FIG. 7 is a fragmentation plan view of the interior of the lattice member taken along section line 7—7 of FIG. 3.

Referring to FIGS. 6 and 7, each thimble tube 280 is attached, such as by bulging and/or welding, to its associated thimble cell 420 for affixing each lattice member 310 at a predetermined location along the axial length of fuel assembly 120. In addition, formed from the interior of the walls of each rod cell 420 and inwardly projecting or extending therefrom are a plurality of resilient spring members 430 for frictionally supporting and retaining each fuel rod 130 in its associated rod cell 410, so that fuel rod 130 does not move axially, laterally, or rotationally during normal operation and postulated accident situations experience by reactor core 60. Each spring member 430 is disposed at an acute angle, which angle may be approximately 45 degrees, with respect to a resilient first dimple 440 and a resilient second dimple 450 that are coaxially aligned and that are formed from the interior walls of each rod cell 420. Dimples 440/450 frictionally support each fuel rod 130. In the preferred embodiment of the invention, first dimple 440 is disposed upstream of coolant fluid flow, while second dimple 450 is disposed downstream of coolant fluid flow. Thus, it will be understood from the above description that each fuel rod 130 is supported and held within its respective rod cell 410 at six points of engagement or contact because four dimples and two spring members project inwardly into each rod cell 410 to frictionally engage each fuel rod 130.

Turning now to FIGS. 5, 6, 7, 8, and 9, integrally attached to the upstream edge of each first inner strap 340 and each second inner strap 370 and associated with each rod cell 410 is deflector means, such as a plurality of spaced-apart deflector vanes 460, for deflecting a component of the fluid stream about each fuel rod 130, which extends through its respective rod cell 410. Each deflector vane 460 helically curvilinearly extends above and protrudes partially over its associated rod cell 410 for causing a vortex as the fluid stream flows past and through rod cell 410, so that the deflected component of the fluid stream swirls about the longitudinal center axis of fuel rod 130. In the preferred embodiment of the invention, the plurality of deflector vanes 460 are a pair of deflector vanes 460 associated with each rod cell 410. Each deflector vane 460 has a helically curved undersurface 470 for generating the previously mentioned vortex. Deflector vane 460 may be curved inwardly from the upstream edge of inner straps 340/370 so as to form a generally acute angle with respect to the flow direction of the fluid stream. The two deflector vanes 460 are oppositely oriented with respect to each other so that the two spiral vortices created by the pair of deflector vanes 460 associated with each rod cell 410 do not flow counter-current to each other. Avoiding such counter-current flow prevents disruption of the spiral vortices and provides a desired combined spiral vortex flow pattern that ascends spirally upwardly along the exterior surface of fuel rod 130. Thus, when first inner straps 340 and second inner straps 340 are suitably interlocked, as previously described, each rod cell 410 will have two deflector vanes 460 associated with it. The provision of two deflector vanes 460 ensures that the component of the fluid stream deflected about the longitudinal axis of each fuel rod 130 will have greater swirling action as compared to having only one deflector vane 460. Each of the two deflector vanes 460 will extend or protrude partially over its associated rod cell 410 for deflecting a component of the fluid stream flowing upwardly through rod cell 410. In this regard, the undersurface 470 of each deflector vane 460 upwardly curvilinearly extends from the upstream edge of first inner strap 340 or second inner strap 370 a predetermined distance above rod cell 410 and inwardly protrudes over each rod cell 410 for redirecting the fluid flow stream in the direction of the arrows in FIG. 8. In addition, the two deflector vanes associated with each rod cell 410 are located such that one of the two deflector vanes 460 is disposed sufficiently near each extreme corner of rod cell 410. That is, the two deflector vanes 460 are grouped generally symmetrically on the longest diagonal of rod cell 410. Moreover, each first and second inner strap 370 may have a plurality of spaced-apart weld tabs 473 integrally attached to and outwardly extending from the downstream edge of each second inner strap 370 and parallel to the fluid stream to provide weld material for welding first and second inner straps 340/370 after first and second inner straps 340/370 are suitably interlocked. In addition, outer strap 330 may also include a plurality of spaced-apart inwardly bent tabs 475 integrally attached to and outwardly extending from the downstream edge thereof for easily sliding a first fuel assembly 120 past a second fuel assembly 120 during refueling operations, so that the first fuel assembly 120 will not snag or "hang-up" on the second fuel assembly 120. Furthermore, outer strap 330 may include a plurality of spaced-apart inwardly curved deflector fins 477 for deflecting a component of the fluid stream onto the fuel rods 130 that are located along the inner periphery of outer strap 330. In this regard, each deflector fin 477 has a generally pyramid-shaped outer contour and is integrally attached at its base to the upstream edge of outer strap 330 and extends above and partially over its associated rod cell 410.

OPERATION

During operation of reactor 10, the flow stream of liquid moderator coolant enters inlet nozzle 30 and flows in the general direction of one of the horizontal arrows shown in the FIG. 1. The fluid stream is then caused to turn upwardly through flow orifices 110 to flow past and through each fuel assembly 120 disposed in reactor core 60, the fluid flow through reactor core 60 being generally in the direction of the vertical arrows shown in FIG. 1. After flowing through reactor core 60, the fluid stream exits reactor 10 through outlet nozzle 40 in the general direction of the other horizontal arrow shown in FIG. 1.

As the fluid stream flows through reactor core 60, it will pass through each rhombic-shaped rod cell 410 defined by lattice member 310. As the fluid stream flows through each lattice member 310 and its associated rod cells 410, the velocity of the fluid stream will decrease and a pressure drop will occur due to the obstruction caused by the lattice member being disposed in the fluid stream. This pressure drop may lead to nucleate boiling on the exterior surface of the fuel rod 130 in the region of rod cell 410. If deflector vanes 460 were not present and if the heat generated by fuel rod 130 is high enough, partial or stable film boiling (i.e., DNB) may occur on the surface of rod 130 resulting in "burnout", which is undesirable for safety reasons. Therefore, deflector vanes 460 are provided to deflect the fluid stream helically inwardly toward the exterior surface of fuel rod 130 to avoid partial or stable film boiling. Even in the case of hexagonal grids with triangular pitch but no deflector vanes, deflector vanes 460 will improve DNB and thermal performance. Such improved DNB performance will result in an approximately 25% increase in fuel rod thermal efficiency compared to existing designs having hexagonal grids with triangular pitch but not having deflector vanes or deflector fins.

The rhombic transverse contour of each rod cell 410 cooperates or coacts with the curved undersurface 470 of each deflector vane 460 to generate a vortex so that DNB is avoided. In this regard, the rhombic shape of each rod cell 410 has a reduced transverse flow area to fluid flow as compared to the square-shaped rod cell of more traditional core designs. Therefore, because of the reduced transverse flow area of rod cell 410, which is provided by the rhombic shape or rod cell 410, more of the fluid stream flowing upwardly through rod cell 410 will be forced to contact undersurface 470 of each deflector vane 460 as the fluid stream exits rod cell 410. Hence, because more of the fluid stream contacts undersurface 470 of deflector vane 460, more of the fluid stream will be deflected than in the traditional square pitch array. This will in turn cause a larger vortex for maintaining liquid substantially single-phase fluid flow on the exterior of fuel rod 130 in order to avoid DNB.

In addition, rhombic-shaped rod cells 410 belonging to lattice member 310 in combination with deflector vanes 460 substantially obviate the need for larger and more costly reactor coolant pumps to increase fluid flow velocity in order to maintain liquid substantially single-phase fluid flow over the exterior of fuel rods 130. This is so because the vortices generated by each rod cell 410 and associated deflector vanes 460 inherently accelerate fluid flow about the exterior surface of each fuel rod 130.

Moreover, rhombic-shaped rod cells 410 allow for a triangular pitch fuel rod array having a reduced pitch between centers of adjacent fuel rods 130, as compared to the more traditional square-pitch rod array. This allows fuel rods 130 to be more densely packed in order to obtain more power from a reactor core of given size. This is desirable because a more densely packed reactor core achieves more revenue-producing power per unit volume which in turn increases return on plant investment.

Furthermore, it will be understood from the description hereinabove that deflector vanes 460 cause the cooler bulk coolant to suitably mix with the warmer fluid near the surface (i.e., outer diameter 170) of each fuel rod 130 such that the temperature difference between the bulk coolant and the fluid near the fuel rod surface is minimized. This obtains liquid substantially single-phase flow over the fuel rod surface for avoiding DNB.

Although the invention is illustrated and described herein it its preferred embodiments, it is not intended that the invention as illustrated and described be limited to the details shown, because various modifications may be obtained with respect to the invention without departing from the spirit of the invention or the scope of equivalents thereof. For example, the vortex or helical flow distribution axially along the outside surface of the fuel rod may be varied, if desired, by varying the placement and number of deflector vanes associated with each rod cell.

Therefore, what is provided is a fuel assembly including deflector vanes for suitably deflecting a component of a fluid stream flowing past such fuel assembly.

We claim:

1. A fuel assembly, comprising:
   (a) a lattice member defining a plurality of rhombic-shaped rod cells and a plurality of generally rhombic-shaped thimble cells therethrough;
   (b) a plurality of fuel rods, each of said fuel rods extending through respective ones of the rod cells;
   (c) a plurality of thimble tubes, each of said thimble tubes extending through respective ones of the thimble cells; and
   (d) deflector means associated with each of the rod cells and attached to said lattice member and protruding over its associated rod cell for deflecting a liquid component of a fluid stream about said fuel rod extending through the rod cell.

2. The fuel assembly according to claim 1, wherein said deflector means curvilinearly protrudes over its associated rod cell.

3. The fuel assembly according to claim 2, wherein said deflector means is a pair of deflector vanes.

4. A fuel assembly capable of deflecting a component of a liquid fluid stream flowing past the fuel assembly, comprising:
   (a) a lattice member having a hexagonally-shaped transverse contour, said lattice member defining a plurality of rhombic-shaped rod cells and a plurality of generally rhombic-shaped thimble cells therethrough;
   (b) a plurality of elongate fuel rods disposed in spaced parallel array, each of said fuel rods extending through respective ones of the rod cells;
   (c) a plurality of elongate thimble tubes disposed in spaced parallel array, each of said thimble tubes extending through respective ones of the thimble cells; and
   (d) a deflector vane associated with each of the rod cells and integrally attached to said lattice member and curvilinearly protruding over its associated rod cell obliquely to the fluid stream for deflecting a component of the fluid stream about each of said fuel rods.

5. The fuel assembly according to claim 4, further comprising a second deflector vane associated with each of the rod cells and integrally attached to said lattice member and curvilinearly protruding over its associated rod cell obliquely to the fluid stream for deflecting a component of the fluid stream about each of said fuel rods.

6. A fuel assembly capable of deflecting a component of a liquid fluid stream flowing past the fuel assembly, the fluid stream having a flow axis, the fuel assembly comprising:
   (a) a lattice member, including:
      (i) an outer strap having a hexagonally-shaped transverse contour disposed edgewise in the fluid stream;
      (ii) a plurality of first inner straps disposed edgewise in the flow stream, each of said first inner straps attached to said outer strap interiorly of said outer strap;
      (iii) a plurality of second inner straps disposed edgewise in the fluid stream, each of said second inner straps attached to said outer strap interiorly of said outer strap, each of said second inner straps intersecting each of said first inner straps at an angle with respect to each of said first inner straps for defining a plurality of rhombic-shaped rod cells and a plurality of generally rhombic-shaped thimble cells through said lattice member;
   (b) a plurality of elongate fuel rods disposed in spaced parallel array in the fluid stream and extending through respective ones of the rod cells, each of said fuel rods having a longitudinal axis parallel to the flow axis of the fluid stream;
   (c) a plurality of elongate thimble tubes disposed in spaced parallel array in the fluid stream and extending through respective ones of the thimble cells, each of said thimble tubes having a longitudinal axis parallel to the flow axis of the fluid stream; and
   (d) a plurality of deflector vanes associated with each of the rod cells, each of said deflector vanes integrally attached to said lattice member and curvilinearly protruding over its associated rod cell obliquely to the flow axis of the fluid stream for deflecting a component of the fluid stream about the longitudinal axis of said fuel rod extending through the associated rod cell.

7. The fuel assembly according to claim 6, wherein each of said plurality of deflector vanes helically curvilinearly protrudes over its associated rod cell for causing a vortex so that the component of the fluid stream deflected about the fuel rod swirls about the longitudinal axis of said fuel rod.

8. The fuel assembly according to claim 7, wherein said plurality of deflector vanes is a pair of oppositely oriented deflector vanes offset one from the other for causing two vortices, so that the component of the fluid stream deflected about the longitudinal axis of said fuel rod obtains greater swirling action.

9. In a nuclear reactor core having a liquid fluid stream flowing therethrough, the fluid stream having a unidirectional flow axis, a fuel assembly capable of deflecting a component of the fluid stream flowing past the fuel assembly, the fuel assembly comprising:
   (a) a first tie plate;
   (b) a second tie plate spaced-apart from and coaxially aligned with said first tie plate;
   (c) a plurality of spaced-apart and coaxially aligned lattice members interposed between said first tie plate and said second tie plate, each of said lattice members including:
      (i) an outer strap having a regular hexagonally-shaped transverse contour disposed edgewise in the fluid stream, said outer strap having at least one elongate side panel;
      (ii) a plurality of elongate parallel first inner straps disposed edgewise in the fluid stream, each of said first inner straps attached to said outer strap and extending transversely interiorly of said outer strap parallel to the side panel;
      (iii) a plurality of elongate parallel second inner straps disposed edgewise in the fluid stream, each of said second inner straps attached to said outer strap and extending transversely interiorly of said outer strap, each of said second inner straps intersecting each of said first inner straps at an angle with respect to each of said first inner straps for defining a plurality of rhombic-shaped rod cells and a plurality of generally rhombic-shaped thimble cells through said lattice member;
   (b) a plurality of elongate generally cylindrical fuel rods disposed in spaced parallel array in the fluid stream and capable of generating heat, each of said fuel rods interposed between said first tie plate and said second tie plate and having a longitudinal axis parallel to the flow axis of the fluid stream, each of said fuel rods extending through respective ones of the rod cells;
   (c) a plurality of elongate generally cylindrical thimble tubes disposed in spaced parallel array in the fluid stream, each of said thimble tubes interposed between said first tie plate and said second tie plate and having a first end portion connected to said first tie plate and a second end portion connected to said second tie plate for interconnecting said first tie plate and said second tie plate, each of said thimble tubes having a longitudinal axis parallel to the flow axis of the fluid stream, each of said thimble tubes extending through respective ones of the thimble cells; and (d) a plurality of deflector vanes associated with each of the rod cells, each of said deflector vanes attached to said lattice member and curvilinearly protruding over its associated rod cell obliquely to the flow axis of the fluid stream for deflecting a component of the fluid stream about the longitudinal axis of said fuel rod extending through the associated rod cell, whereby the rhombic shape of each rod cell and the curvature of each protruding deflector vane coact to obtain liquid substantially single-phase fluid flow over said fuel rod to transfer the heat from said fuel rod to the fluid stream as said deflector vane deflects the component of the fluid stream about the longitudinal axis of said fuel rod.

10. The fuel assembly according to claim 9, wherein each deflector vane helically curvilinearly protrudes over its associated rod cell for swirling the component of the fluid stream about the longitudinal axis of said fuel rod to transfer the heat from said fuel rod to the fluid stream.

11. The fuel assembly according to claim 10, further comprising two oppositely oriented deflector vanes offset one from the other for causing two vortices, so that the component of the fluid stream deflected about the longitudinal axis of the fuel rod obtains greater swirling action to transfer more of the heat from said fuel rod to the fluid stream.

* * * * *